United States Patent [19]

Suzuki

[11] Patent Number: 6,097,692

[45] Date of Patent: Aug. 1, 2000

[54] APPARATUS FOR FEEDING AND EJECTING AN OPTICAL CARD

[75] Inventor: Kazunori Suzuki, Yokohama, Japan

[73] Assignee: Canon Kabushiki Kaisha, Tokyo, Japan

[21] Appl. No.: 08/608,959

[22] Filed: Feb. 29, 1996

Related U.S. Application Data

[63] Continuation of application No. 08/257,949, Jun. 10, 1994, abandoned, which is a continuation of application No. 07/862,291, Apr. 2, 1992, abandoned.

[30] Foreign Application Priority Data

| Apr. 10, 1991 | [JP] | Japan | ................................... 3-104667 |
| Apr. 10, 1991 | [JP] | Japan | ................................... 3-104668 |
| Sep. 11, 1991 | [JP] | Japan | ................................... 3-261019 |

[51] Int. Cl.$^7$ ............................ G11B 17/02; G06K 13/00
[52] U.S. Cl. ....................... 369/262; 369/77.1; 369/258; 235/479
[58] Field of Search ................................... 369/77.1, 258, 369/262, 213; 235/475, 479; 360/2, 99.06, 99.07

[56] References Cited

U.S. PATENT DOCUMENTS

| 4,724,498 | 2/1988 | Takikawa et al. ....................... 369/262 |
| 4,735,578 | 4/1988 | Ruchardt et al. ........................ 439/152 |
| 4,907,098 | 3/1990 | Ohkada et al. ............................. 360/2 |
| 4,916,687 | 4/1990 | Endo ........................................ 369/258 |
| 4,935,916 | 6/1990 | Suzuki et al. ............................ 369/215 |
| 4,937,684 | 6/1990 | Kurihara et al. ............................ 360/2 |
| 4,995,027 | 2/1991 | Aoyagi et al. ....................... 360/99.06 |
| 5,089,694 | 2/1992 | Zerfahs et al. ............................. 360/2 |
| 5,099,111 | 3/1992 | Takukura et al. ....................... 235/475 |
| 5,146,069 | 9/1992 | Orimoto et al. ........................ 235/475 |
| 5,150,352 | 9/1992 | Kurihara ................................. 369/258 |
| 5,179,484 | 1/1993 | Nakajima .............................. 360/99.06 |

FOREIGN PATENT DOCUMENTS

| 0257532 | 3/1988 | European Pat. Off. . |
| 0296590 | 12/1988 | European Pat. Off. . |
| 0386705 | 9/1990 | European Pat. Off. . |
| 0478373 | 4/1992 | European Pat. Off. . |
| 3602668 | 7/1987 | Germany . |

*Primary Examiner*—Robert S. Tupper
*Assistant Examiner*—Paul J Ditmyer
*Attorney, Agent, or Firm*—Fitzpatrick, Cella, Harper & Scinto

[57] ABSTRACT

There is disclosed an apparatus for carrying an information recording medium, in which recording of information on and/or reproduction of information from the recording medium is effected by causing a base for holding the recording medium to reciprocally move to an optical head for recording and/or reproducing. The apparatus has a feeding mechanism for feeding the recording medium to the base, and an ejecting mechanism for ejecting the recording medium from the base. The ejecting mechanism is provided on the base.

5 Claims, 12 Drawing Sheets

APPARATUS FOR FEEDING AND EJECTING AN OPTICAL CARD

This application is a continuation of application Ser. No. 08/257,949, filed Jun. 10, 1994, which is a continuation of application Ser. No. 07/862,291, filed Apr. 2, 1992, now both abandoned.

BACKGROUND OF THE INVENTION

1. Field of the Invention

The present invention relates to an apparatus for carrying an information recording medium for an information recording and reproducing apparatus for recording information on a recording medium and/or reproducing information from a recording medium.

2. Related Background Art

Heretofore, there have been an electromagnetic system and an optical system for an information recording and reproducing apparatus, and particularly in recent years, the optical system has been given much attention. For an information recording/reproducing apparatus using a light beam, there is the CD in which a disc type recording medium is rotated, the video disc using an optical disc and a photomagnetic disc, the optical card which performs the reciprocating travel of a card type recording medium, and some other apparatus such as using an optical tape. These apparatuses are used appropriately depending on the purposes, but among them, the optical card is particularly attracting attention because of its desirable portability. For the use of the optical card as an information recording medium, there is known among the various methods which have hitherto been designed, a method in which a light beam is irradiated on an optical card and the irradiating position of the light beam is linearly moved, and is further moved relatively in the direction perpendicular to the direction of the linear movement, that is, in the direction intersecting the information track of the optical card.

For a conventional method of this kind, there is known a method illustrated in FIGS. 1 through 4. FIG. 1 is a perspective view illustrating a first conventional example, in which a stacker, that is, a card base 2, movably supported in the direction X along rails 1a and 1b is arranged to cause an optical card C inserted from its side to be fixed on the circumference thereof from above by compression of flat springs 3a and 3b of a card pressing member 3. The feed rollers 4a and 4b which are provided for inserting the optical card C into the card base 2 are rotatively driven by a motor 6 through a driving shaft 5 to feed the optical card C. In order to feed the optical card C to a butting portion 2a of the card base 2, cut-out portions 3c and 3d are provided on the card pressing member 3 so as to arrange the feed rollers 4a and 4b in these cut-out portions 3c and 3d. The motor 6 and the driving shaft 5 can be moved vertically by driving with a spring 9 and a solenoid 10 having a movable iron core 8 fixed to one end of a member 7, which is rotatively mounted on a shaft 7a.

FIGS. 2A through 2C are cross-sectional views taken along the line I—I in FIG. 1. FIG. 2A illustrates the state when the optical card C is being inserted into the card base 2. FIG. 2B illustrates the state when the feed rollers 4a and 4b serving as a carrier system are raised from the card stand 2. FIG. 2C illustrates the state when the optical card C is being ejected from the card base 2. When the optical card C is carried to the butting portion 2a of the card base 2 by the feed rollers 4a and 4b to position the optical card C on the card base 2, the motor is stopped, and further, the feed rollers 4a and 4b are raised by the solenoid 10 to release them from the carrying state of the optical card C. The optical card C thus positioned on the card base 2 is releaved from this feeding system and is allowed to perform the linearly reciprocating movement together with the card base 2 for recording/reproducing.

Subsequent to the recording/reproducing, the motor 6 is reversely rotated while the solenoid 10 is caused to lower the feed rollers 4a and 4b so that the optical card C can enter the carrier system to be ejected by the feed rollers 4a and 4b.

FIG. 3 is a perspective view illustrating a second conventional example in which feed rollers 13a and 13b, and 13c and 13d are mounted on parallel shafts 11a and 11b which are arranged vertically to face each other to pinch the optical card C for inserting the optical card C into the card stand 12. In this conventional example, the length of the traveling direction of the card base 12 is made shorter than the length of the longitudinal direction of the optical card C in order to allow the optical card C to be inserted to the butting portion 12a of the card base 12, and the feed rollers 13a through 13d are arranged at that position. As shown in FIG. 4A, which is a cross-sectional view taken along the line II—II in FIG. 3, the optical card C is pinched by the feed rollers 13a through 13d to be fed into the card base 12. At this juncture, the optical card C is inserted while being biased by a pressing member 14 so as to be in parallel with a pressing plane 15. Then, when the optical card C is butted to the butting portion 12a of the card base 12, its positioning is terminated. When the optical card C is positioned, the feed rollers 13a and 13b, and 13c and 13d are respectively moved vertically as shown in FIG. 4B to release the carrier system from the optical card C. Thereafter, as in the case of the first conventional example, the recording/reproducing is conducted and then as shown in FIG. 4C, the optical card is ejected.

However, there is a common disadvantage given below in the mechanism using the above-mentioned feed rollers. In other words, in the first conventional example, it is impossible to press the optical card C sufficiently because the pressing member 3 to compress the optical card C is partially cut off, and the camber of the optical card C and the like cannot be removed to result in a considerable deviation of the optical card C in recording/reproducing. Accordingly, there is a drawback that errors tend to occur in recording/reproducing using an optical head. Also, in the second conventional example, the optical card C is partially positioned out of the card base 12, which results in the same kind of drawback as in the first conventional example.

Then, in either example of the conventional apparatus, the feed rollers for carrying the optical card C are arranged near the card base in such a feed roller mechanism to interfere with its linearly reciprocating movement. Therefore, when the optical card C is fed into the card base, the feed rollers should be retracted immediately after the optical card C has been positioned so that the feed rollers are parted from the card base. To this end, it is required to cause the rotation of the feed rollers to be stopped accurately and reliably immediately before the retraction and also to prevent any slippage of the optical card C and feed rollers. However, it is extremely difficult to comply with these requirements, and the setting precision of the optical card tends to become irregular. As a result, there is encountered a problem that the positions at which to start writing become irregular. Also, the feed rollers should be in contact with the card base and reversed to exhaust the optical card. This results in an intermittent motion and makes it difficult to shorten the operation time.

With the conventional mechanism which has draw-backs described above, it is difficult to perform an accurate positioning in a short period for recording/reproducing while attempting to make the information recording pits super-fine as currently practiced for storing many pieces of information in one optical card.

SUMMARY OF THE INVENTION

It is an object of the present invention to solve the above-mentioned problems and to provide a highly reliable apparatus for carrying an information recording medium thereby to implement carrying an optical card assuredly in a short period of time as well as to position it on a stacker with high precision. Then, in an apparatus for carrying an information recording medium in which the information recording medium is held on a stage and the aforesaid stage is caused to effectuate a reciprocating linear motion with respect to an optical head for recording/reproducing to perform information recording/reproducing operations, there are provided, in order to achieve the above-mentioned object of the present invention, feeding means for feeding the aforesaid information recording medium into the aforesaid stage, and ejecting means for ejecting the aforesaid information recording medium, and then the aforesaid ejecting means is provided on the aforesaid stage.

DETAILED DESCRIPTION OF THE PREFERRED EMBODIMENTS

In accordance with the embodiments shown in FIG. 5 through FIG. 14, the present invention will be described in detail.

Figure 1:
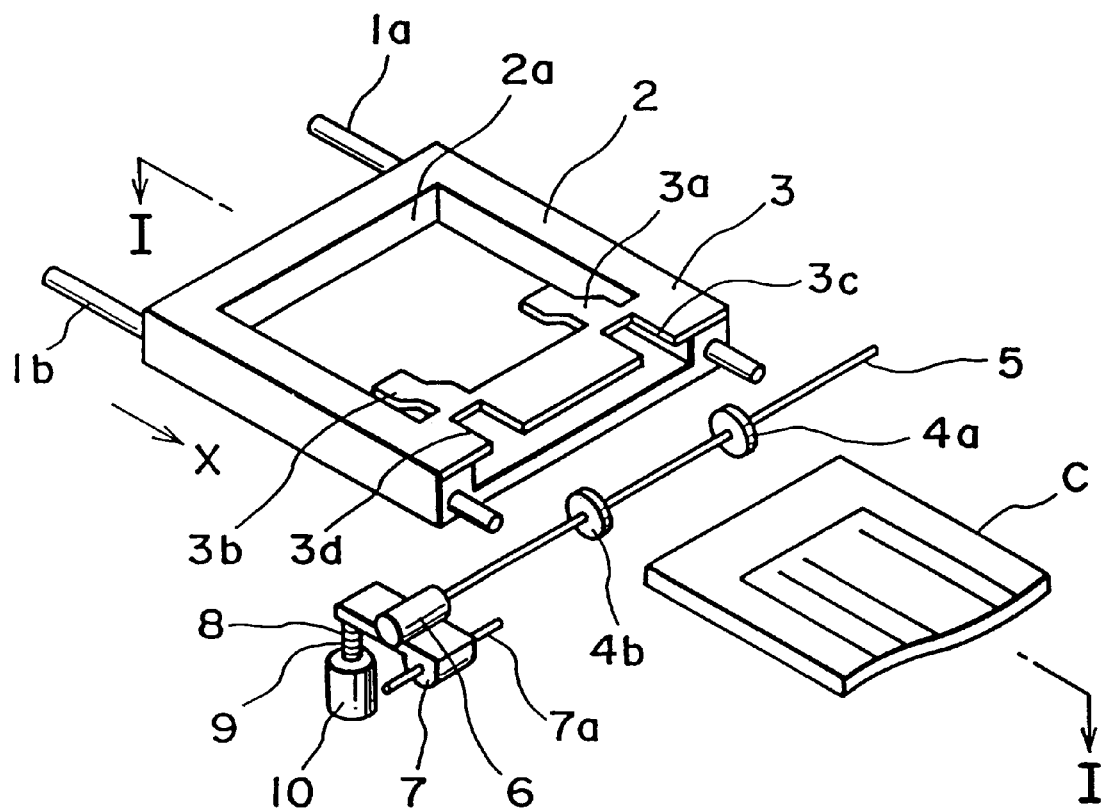
FIG. 1 is a perspective view illustrating a conventional apparatus for carrying an information recording medium.
Figure 2A:
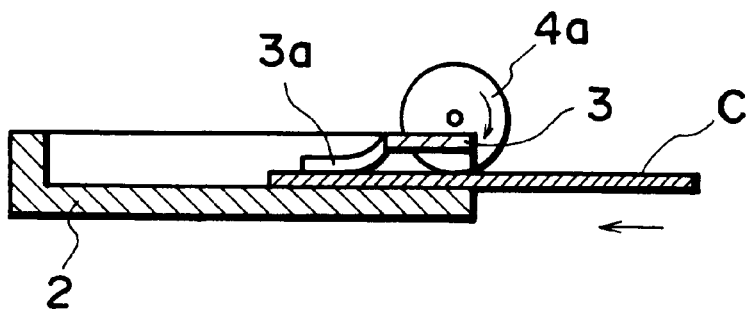
FIGS. 2A, 2B, and 2C are views illustrating the operation of the apparatus shown in FIG. 1.
Figure 2B:
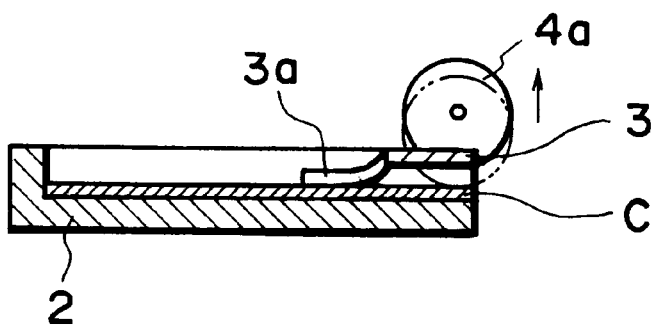
Figure 2C:
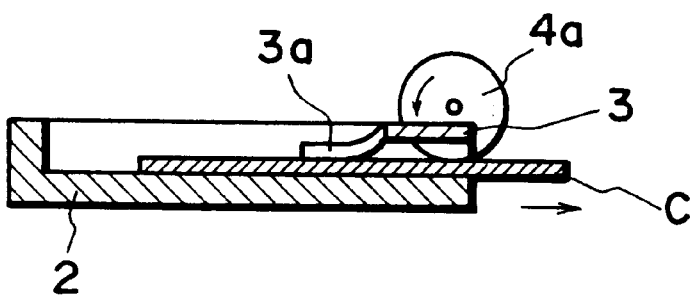
Figure 3:
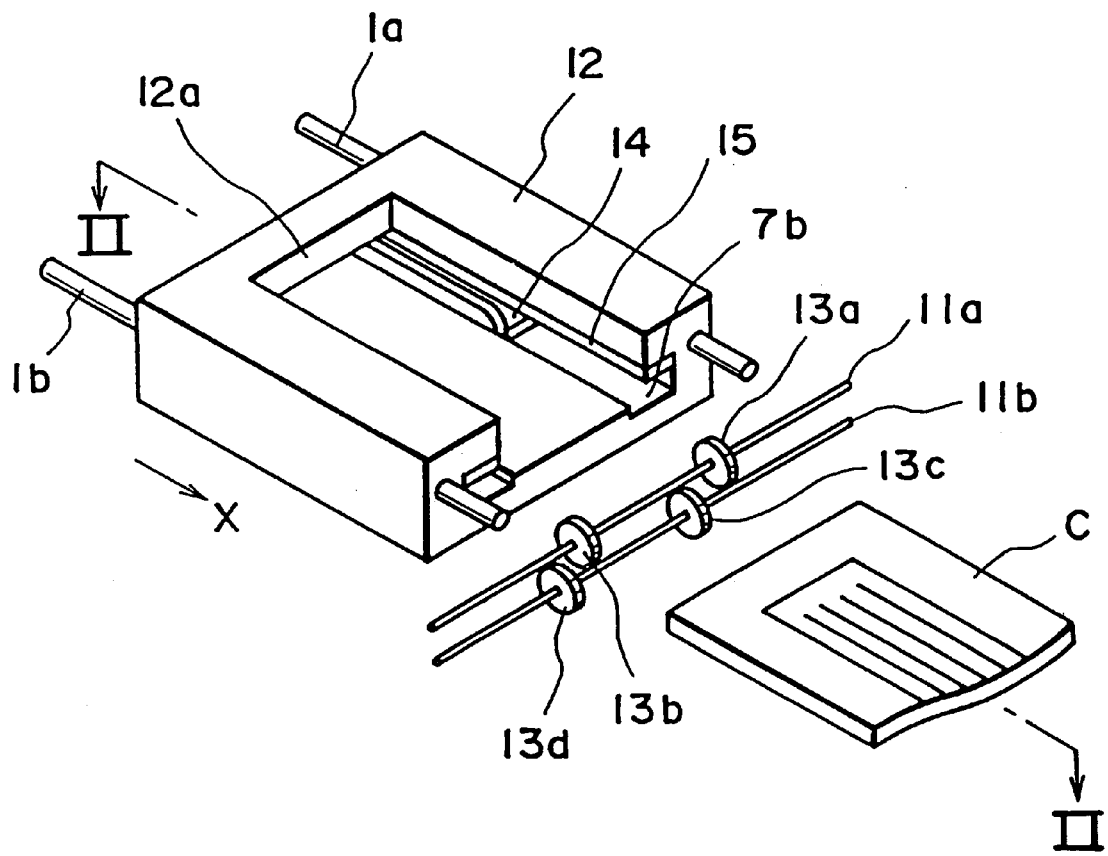
FIG. 3 is a perspective view illustrating another conventional apparatus for carrying an information recording medium.
Figure 4A:
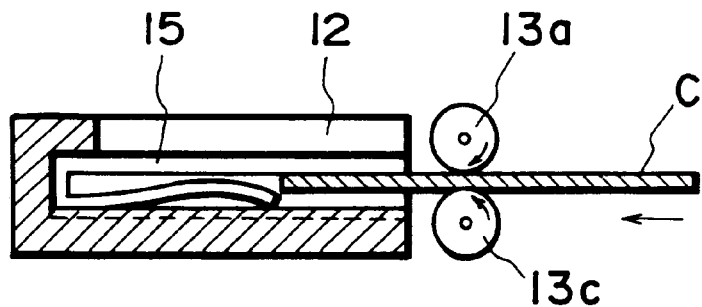
FIGS. 4A, 4B, and 4C are views illustrating the operation of the apparatus shown in FIG. 3.
Figure 4B:
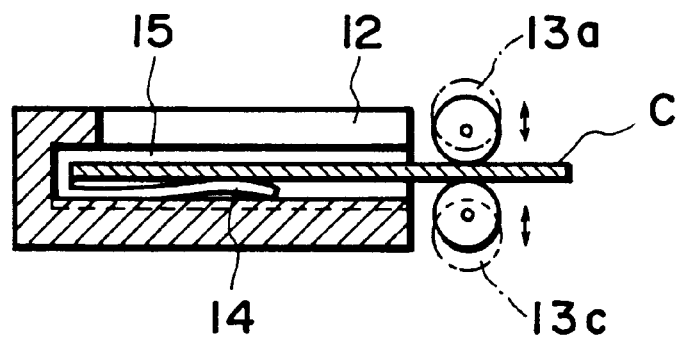
Figure 4C:
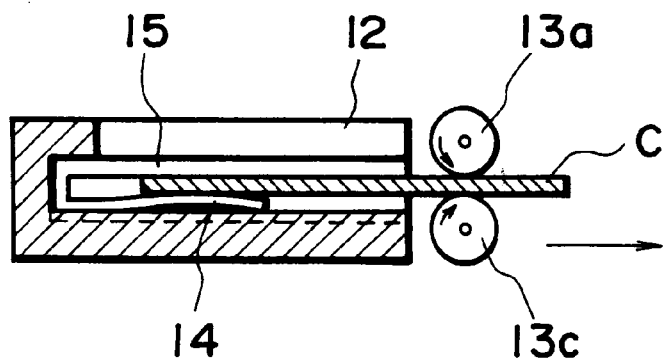
Figure 5:
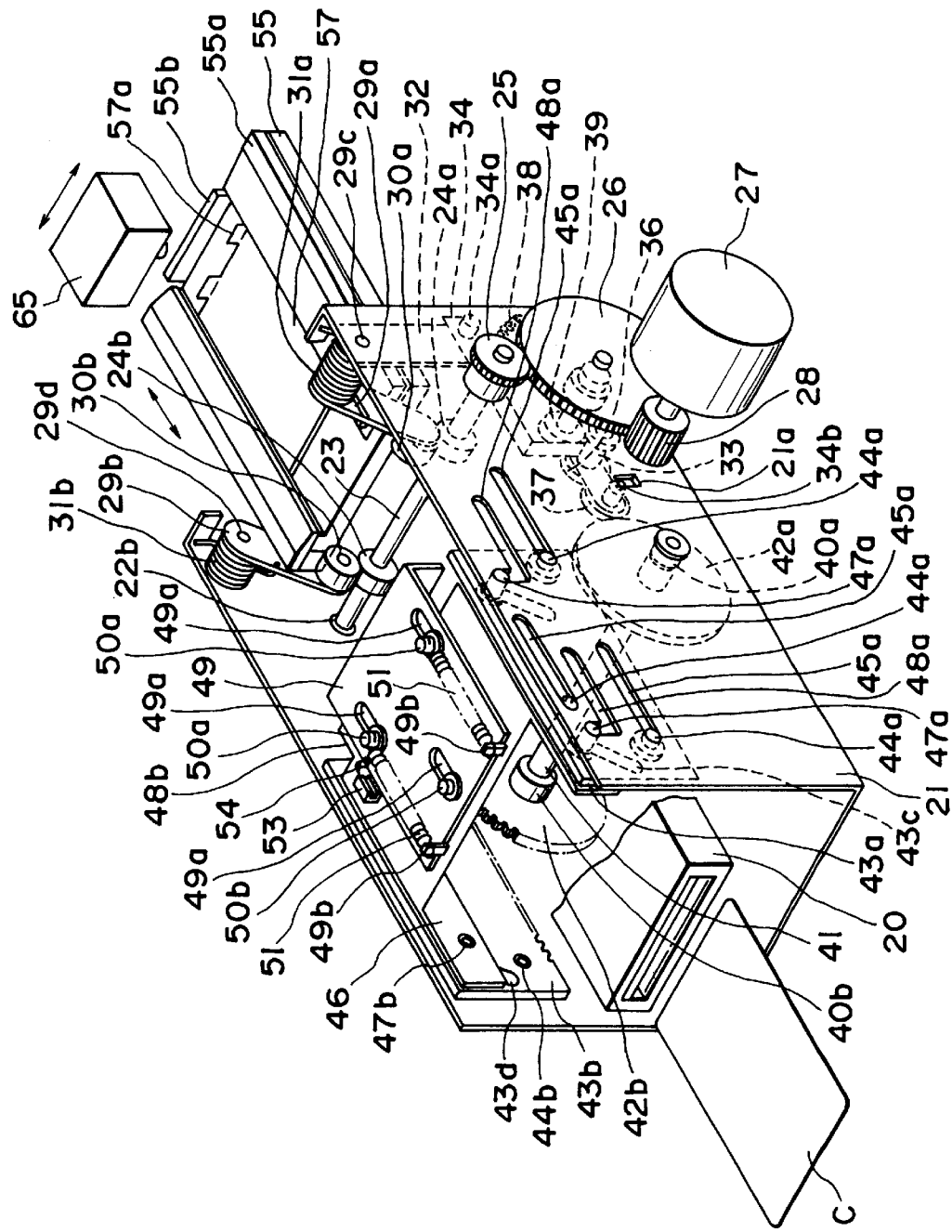
FIG. 5 is a perspective view illustrating an embodiment of an apparatus for carrying an information recording medium according to the present invention.

In FIG. 5, an insertion opening 20 for an optical card is fixed to a carrier frame 21 in a location which is not shown in FIG. 5, and this insertion opening also serves as a feeding guide for the optical card C. In the vicinity of the inner end of the insertion opening 20, there is positioned a driving shaft 23 supported by the carrier frame 21 through bearings 22a and 22b (22b is not shown) to cause driving rollers 24a and 24b fixed to the driving shaft 23 to be rotatively driven in the carrying direction. At the right-hand end of the driving shaft 23, a driving gear 25 is mounted, with which a speed reducing gear 26 is arranged to engage, and a motor gear 28 directly connected to a driving motor 27 is arranged to engage with this speed reducing gear 26. Supporting arms 29a and 29b are fixed to the leading ends of the supporting shafts 29c and 29d which are rotatively supported by the carrier frame 21 in an upper side location diagonally in front of the driving shaft 23. Then, at the leading ends of the supporting arms 29a and 29b, biasing rollers 30a and 30b are rotatively mounted to be in contact with the driving rollers 24a and 24b.

Figure 6:
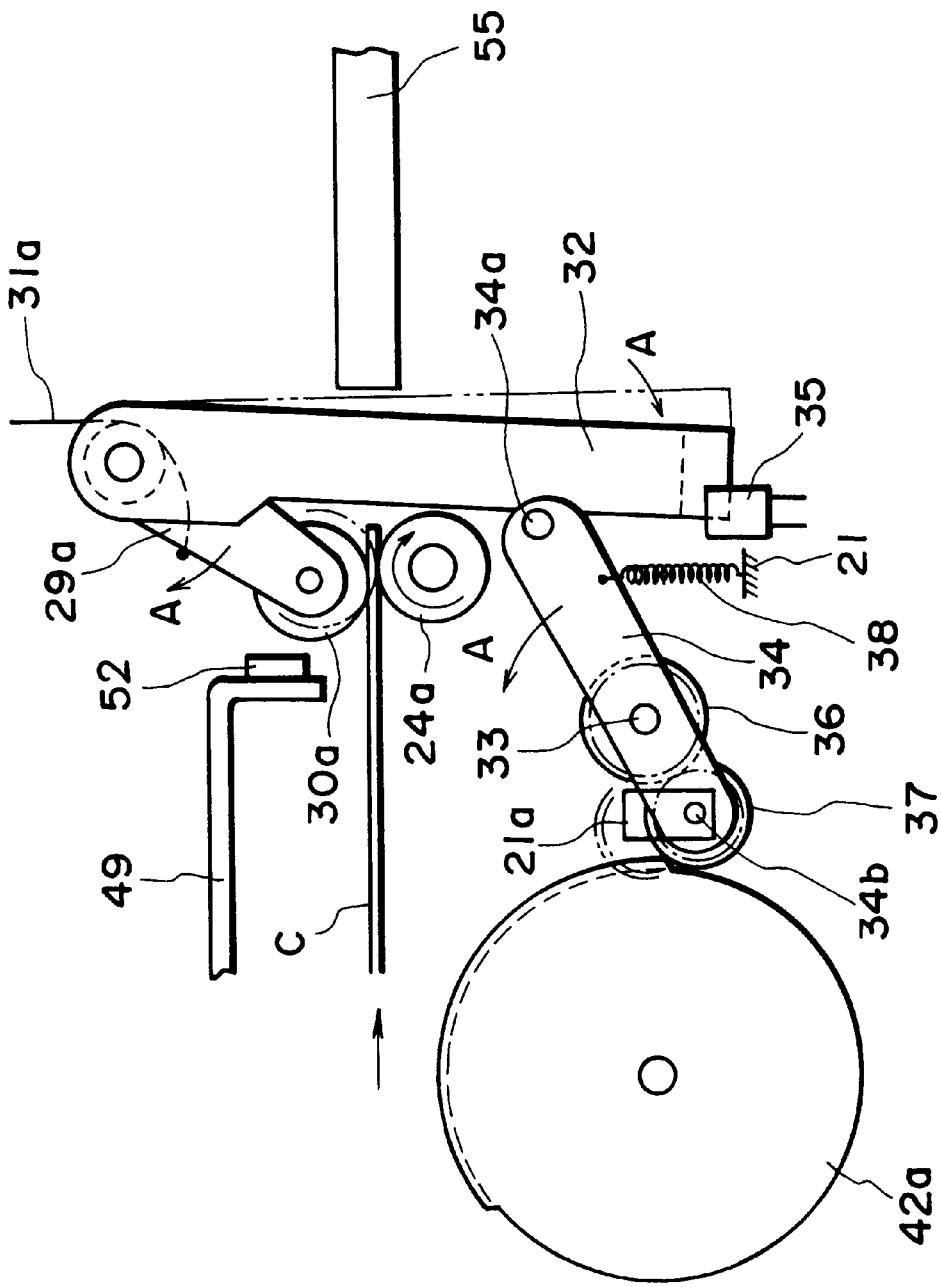
FIG. 6 is a view illustrating the feeding unit of the apparatus shown in FIG. 5.
Figure 7:
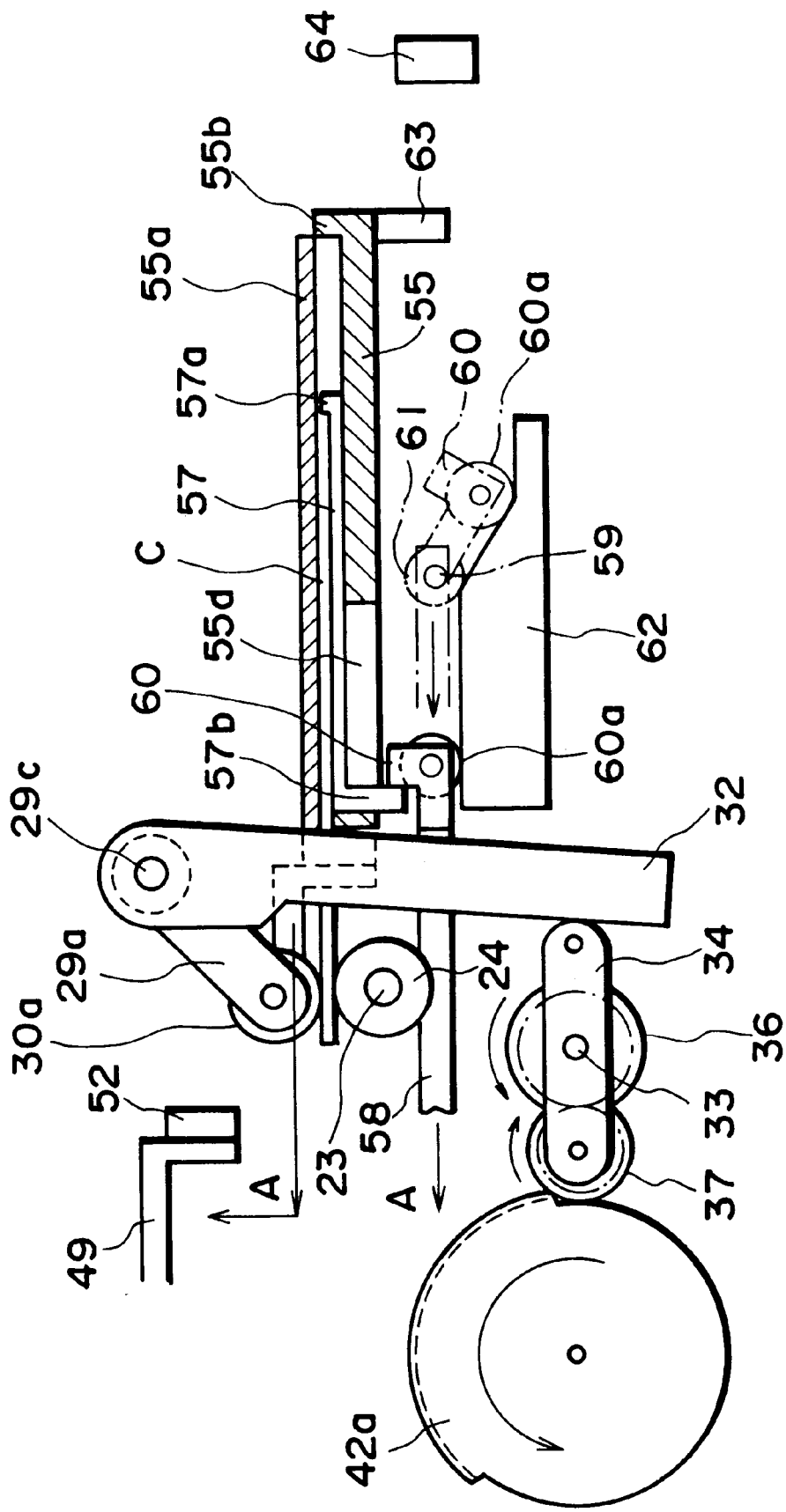
FIG. 7 is a view illustrating the ejecting unit of the apparatus shown in FIG. 5.
Figure 8:
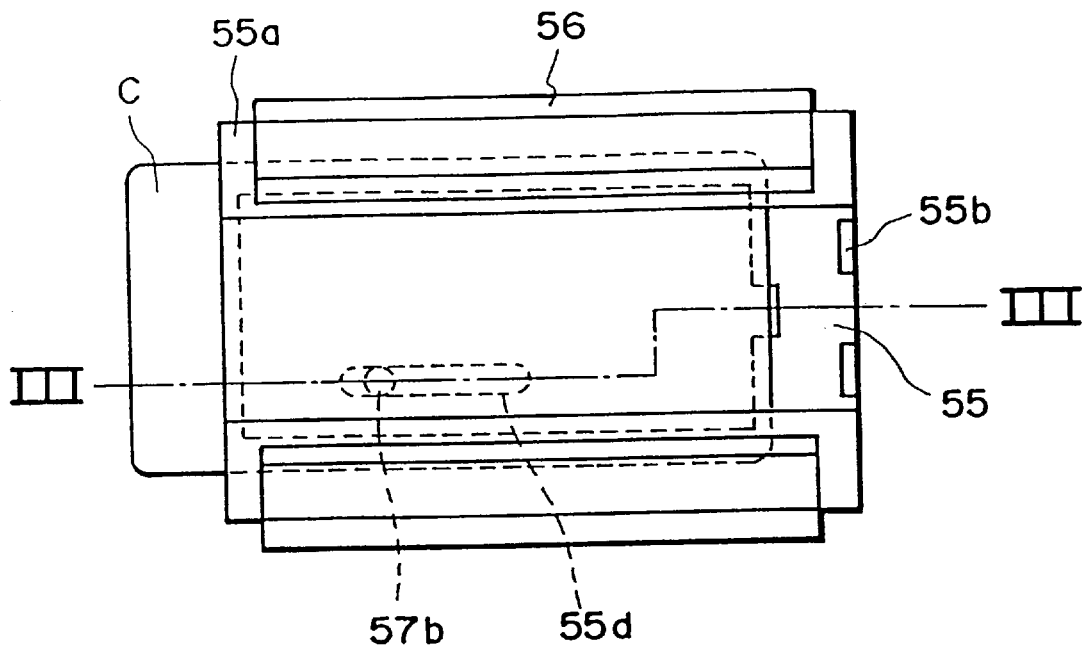
FIG. 8 is a plan view illustrating the stage of the apparatus shown in FIG. 5.
Figure 9:
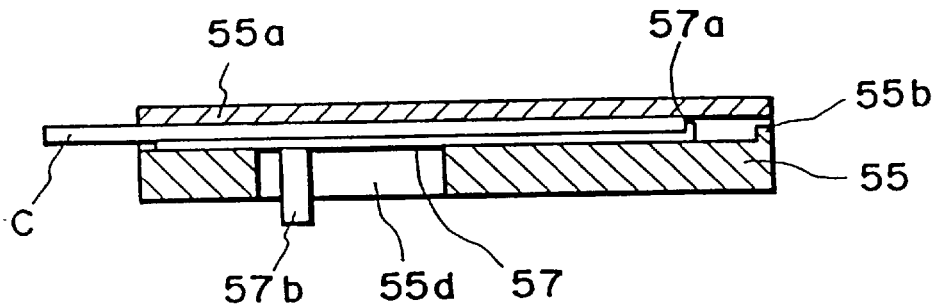
FIG. 9 is a cross-sectional view taken along the line III—III in FIG. 8.
Figure 10:
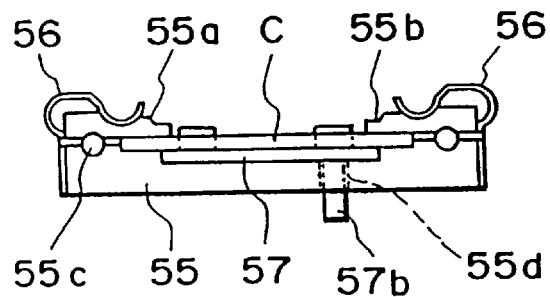
FIG. 10 is a front view illustrating the stage shown in FIG. 8.

The supporting arms 29a and 29b are respectively biased by the biasing springs 31a and 31b which are fixed to the carrier frame 21 respectively at one end thereof so as to allow the biasing rollers 30a and 30b to be biased to the driving rollers 24a and 24b respectively. At the base of the supporting shaft 29c, a lever 32 which is longer than the supporting arm 29a is mounted, and a concavity 34a provided at the front end of the swinging arm 34, which is rotatively supported by a shaft 33 fixed to the rear portion of the carrier frame 21, is in contact with the lever 32. In the vicinity of the leading end of the lever 32, a sensor 35 is fixed as shown in FIG. 6 to detect the position of the lever 32. To the shaft 33, an idler gear 36 is rotatively mounted, and the swing gear 37, which is rotatively amount to the rear end of the swinging shaft 34b is arranged to engage with this idler gear 36. One end of the swinging arm 34 is biased counter-clockwise by a spring 38 fixed to the carrier frame 21 at its one end, and by inserting the swinging shaft 34b through a stopper hole 21a provided on the carrier frame 21, its movement is regulated.

Behind the idler gear 36, there is arranged a coupling gear 39 connected to the speed reducing gear 26 and is allowed to engage with the idler gear 36. Behind the swinging gear 37, there is arranged a connecting shaft 41 rotatively in parallel with the driving shaft 23 through bearings 40a and 40b, and a move gear 42a and swing gear 37 fixed to the right-hand end thereof are allowed to engage with each other. In other words, when the biased rollers 30a and 30b are in contact with the driving rollers 24a and 24b, the swinging arm 34 becomes horizontal so that the distance between the move gear 42a and swing gear 37 is closed to allow them to engage with each other.

To the left-hand end of the connecting shaft 41, there is also fixed a move gear 42b which is interlocked with the move gear 42a, and these gears are arranged to engage with the rack portions provided at the lower ends of the side plates 43a and 43b positioned above them respectively. On the outer sides of the side plates 43a and 43b, guide pins 44a and 44b are projected to fit in the linear guide grooves 45a and 45b (45b is not shown) formed on the side plate of the carrier frame 21 for supporting the side plates 43a and 43b movably only in the front and rear directions. On the inner sides of the side plates 43a and 43b, a setting base 46 is provided over the insertion opening 20, and guide pins 47a and 47b are projected outwardly on the left-hand and right-hand side faces of this setting base 46, which are supported slidably by the L-letter shaped grooves 48a and 48b formed on the carrier frame 21 after being penetrated through the slanting grooves 43c and 43d formed on the side plates 43a and 43b.

On the setting base 46, there is provided a dumper, or setting, plate 49 having a downward bend at its front part, and the guide pins 50a, 50a, and 50b which are fixed on the upper surface of the setting base 46 are arranged to fit respectively into the elongated three grooves 49a, 49a, and 49a so that the setting dumper plate 49 is slidably supported with respect to the setting base 46 in the front and rear directions only by the length of the elongated groove 49a. The setting dumper plate 49 is in a state of being tensioned forwardly by the tensioning springs 51 and 51, the ends of which are hooked to the hooks 49b and 49b formed on the rear portion of the setting dumper plate 49 while the other ends are fixed to the guide pins 50a.

The outer face of the downward bend of the setting dumper plate 49 serves as a butting portion for an optical card C, and as shown in FIG. 6, a setting block 52 of resin or rubber is provided thereon. To the setting base 46, a sensor 53 is fixed to detect any deviation of the relative positions of the setting dumper plate 49 and the setting base by the detecting piece 54 mounted on the setting dumper plate 49.

In front of the driving rollers 24a and 24b, a card base 55 is movably supported by a guide mechanism which is not shown. This card base 55 is arranged to press a card pressing member 55a from above as shown in FIGS, 7, 8, 9, and 10 in order to press the optical card C inserted from behind on both sides of its circumference. In front of the card base, the butting portion 55b is provided for positioning the optical card C. The inner side of the pressing member 55a is biased downwardly by a spring 56 fixed to the card base 55 with a long shaft 55c extending to the front and rear which is sandwiched between the upper surface of the card base 55 and the pressing member 55a. In the inside of the card base 55, a drawing, or slide, plate 57 is held slidably in the front and rear directions at a position which is in contact with the reverse side of the optical card C. At the front end of the drawing plate 57, a contacting portion 57a is formed which is bent upwardly in the central part thereof, where the leading end of the inserted optical card C is allowed to be in contact. Then, on a part of the lower face on the right-hand side of the trailing end of the drawing plate 57, a coupling portion 57b is formed to be projected downwardly from a long opening 55d formed in the front and rear directions on the lower face of the card base 55.

Also, below the driving shaft 23, there is provided an exhaust arm 58 a part of which is connected to the guide plate 43a, and at the front end of this exhaust arm 58, an L-letter shaped lock member 60 is mounted having two rotative rollers 60a through a shaft 59 which is in parallel to the driving shaft 23, and is biased downwardly by a coil spring 61 wound around the shaft 59. Below the lock member 60, a guide plate 62 having a slanting face on a part thereof is arranged, and the lock member 60 which is in contact with the upper surface of the guide plate is rotated in accordance with the positions of the exhaust arm 58 to engage with the coupling portion 57b of the drawing plate 57 from its front.

On the lower face of the card base 55, a light shielding plate 63 is fixed, and a sensor 64 is arranged on the carrier frame 21 to detect this light shielding plate 63. Also, when the optical card C is inserted, the card base 55 is locked at a position along the carrier pass of the driving rollers 24a and 24b by a mechanism which is not shown. In this respect, a numeral 65 designates an optical head for performing recording/reproducing with respect to the optical card C.

Now, the description will be made of the operation. When the optical card C is inserted into the insertion opening 20 and the optical card C is pinched between the driving rollers 24a and 24b and the biasing rollers 30a and 30b as shown in FIG. 6, the biasing rollers 30a and 30b are caused to rise by the thickness of the optical card C. Accompanying this, the supporting arm 29a and the lever 32 connected thereto are rotated in the direction indicated by an arrow A. Thus, the swinging arm 34 is raised by the convex portion 34a to cause the swing gear 37 held by the swinging arm 34 to disengage from the move gear 42a. At the same time, the sensor 35 detects the traveling of the leading end of the lever 32 to drive the driving motor 27. This driving power is transmitted to the driving shaft 23 of the driving rollers 24a and 24b through the motor gear 28, the speed reducing gear 26, and driving gear 25. Hence the optical card C pinched between the rotating driving rollers 24a and 24b and the biasing rollers 30a and 30b is carried in the direction toward the card base 55.

Figure 11:
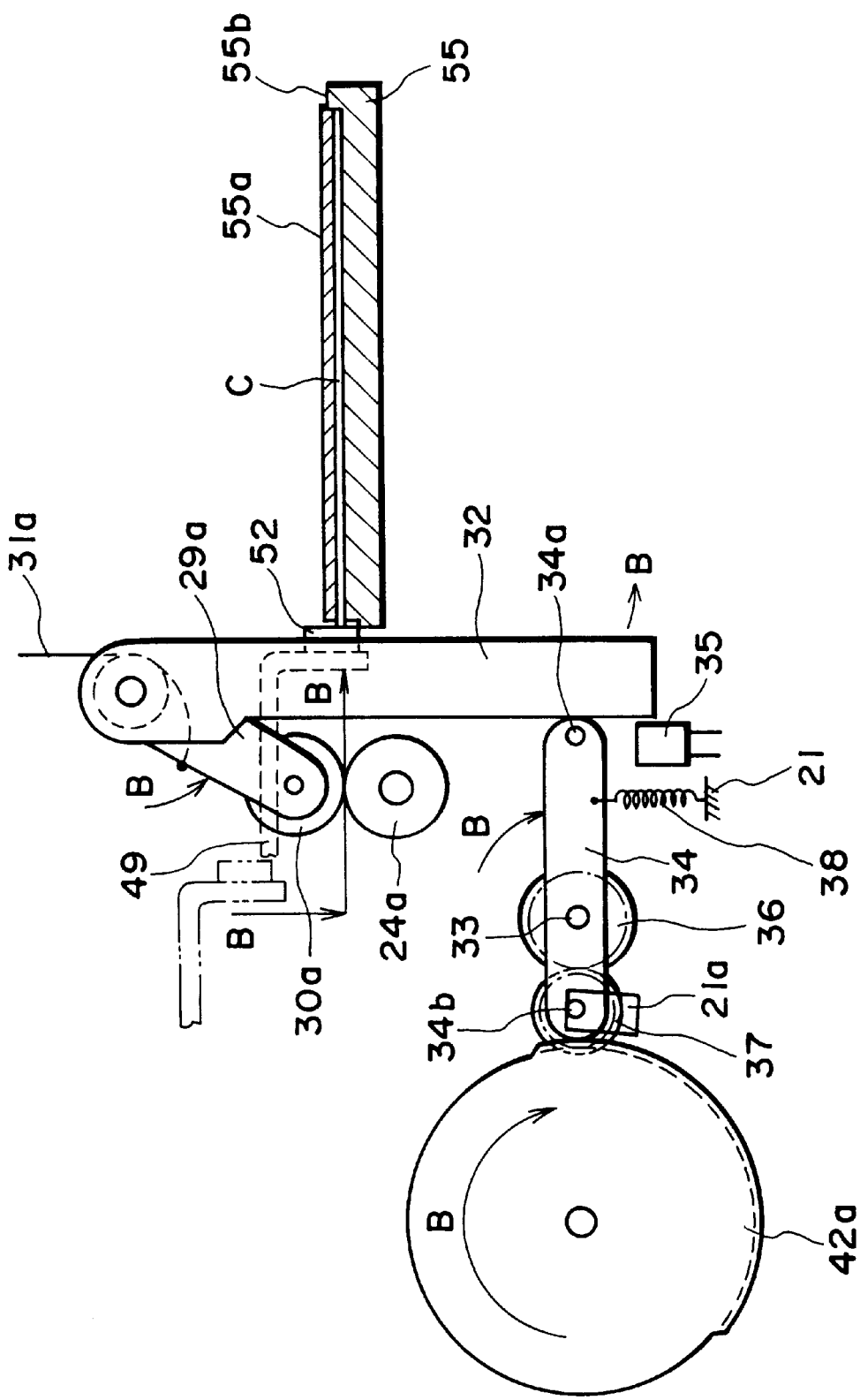
FIG. 11 is a view illustrating the feeding operation of the apparatus shown in FIG. 5.

When the optical card C is released from the driving rollers 24a and 24b and biasing rollers 30a and 30b, the supporting arms 29a and 29b, which are biased by the biasing springs 31a and 31b, and the lever 32 are rotated around the supporting shafts 29c and 29d in the direction indicated by an arrow B as shown in FIG. 11. Then, when the arms and lever are returned to the initial state, the swinging arm 34 is rotated around the idler gear shaft 33 to cause the swing gear 37 to engage with the move gear 42a so that the rotational power of the driving motor 27 is transmitted to the move gear 42a through the connecting gear 39. In this series of operation the rotational direction of the driving motor 27 is in one and the same direction, and when the optical card C is released from the driving rollers 24a and 24b, the swinging arm 34 is switched over to the move gear 42a almost continuously and the rotation is transmitted to the move gear 42a.

Subsequently, the side plates 43a and 43b start to travel forwardly. Then, the setting base 46 is caused to slide downwardly along the slanting grooves 43c and 43d of the side plates 43a and 43b because the guide pins 47a and 47b are regulated by the L-letter shaped grooves 48a and 48b, and discontinues its descent at the lowest end of the slanting grooves 43c and 43d. Then, the setting base is allowed to travel horizontally in the forward direction along the horizontal portion of the L-letter shaped grooves 48a and 48b. Thus, the descending and horizontal traveling of the setting base 46 are operated continuously. The setting dumper plate 49 on the setting base 46 travels horizontally from the descendant position to thrust the rear portion of the optical card C in the longitudinal direction.

Meanwhile, the exhaust arm 58 is advanced together with the side plate 43a. Then, the lock member 60 is caused to travel along the upper end of the guide plate 62 and is rotated downwardly by the biasing force of the coil spring 61 on the slanting face of the guide plate 62. Thus its engagement with the coupling portion 57b of the drawing plate 57 is released. When the leading end of the optical card C inserted in the card base 55 is in contact with the butting portion 57a provided at the front end of the drawing plate 57, the butting portion 57a is biased forwardly to advance together with the drawing plate 57. Thus, the drawing plate 57 is caused to butt against the butting portion 55b of the card base 55.

Here, as shown in FIG. 11, the setting dumper plate 49 is stopped in a state that the optical card C is set by the butting portion 55b through the butting portion 57a, and only the setting base 46 is caused to overrun. Therefore, subsequent to the optical card C having been set on the card base 55, the setting base 46 is allowed to overrun to thrust the setting dumper plate 49 so as to set the optical card C on the card base 55 assuredly. At this juncture, there occurs in the setting base 46 and the setting dumper plate 49, a difference in distances corresponding to this over-running portion. Therefore, with the detecting piece 54 and sensor 53, the setting of the optical card C is confirmed, and if the setting is confirmed, then the positioning lock of the card base 55 is released. In this respect, the optical card C is pressed to the drawing plate 57 by the spring 56 through the pressing member 55a.

Subsequently, the optical card C positioned on the card base 55 is caused to perform the reciprocating linear motion for the recording/reproducing. At this time, the setting dumper plate 49 is in the standby state while blocking the carrier pass of the optical card C. As a result, even if an operator attempts to insert another optical card erroneously, such an optical card C hits the setting dumper plate 49, hence making it possible to prevent any double insertion of the optical card C. In this respect, the setting dumper plate 49 serves to perform the light shielding for the carrier pass. Consequently, any leakage of laser light from the insertion opening 20 can also be prevented.

Figure 12:
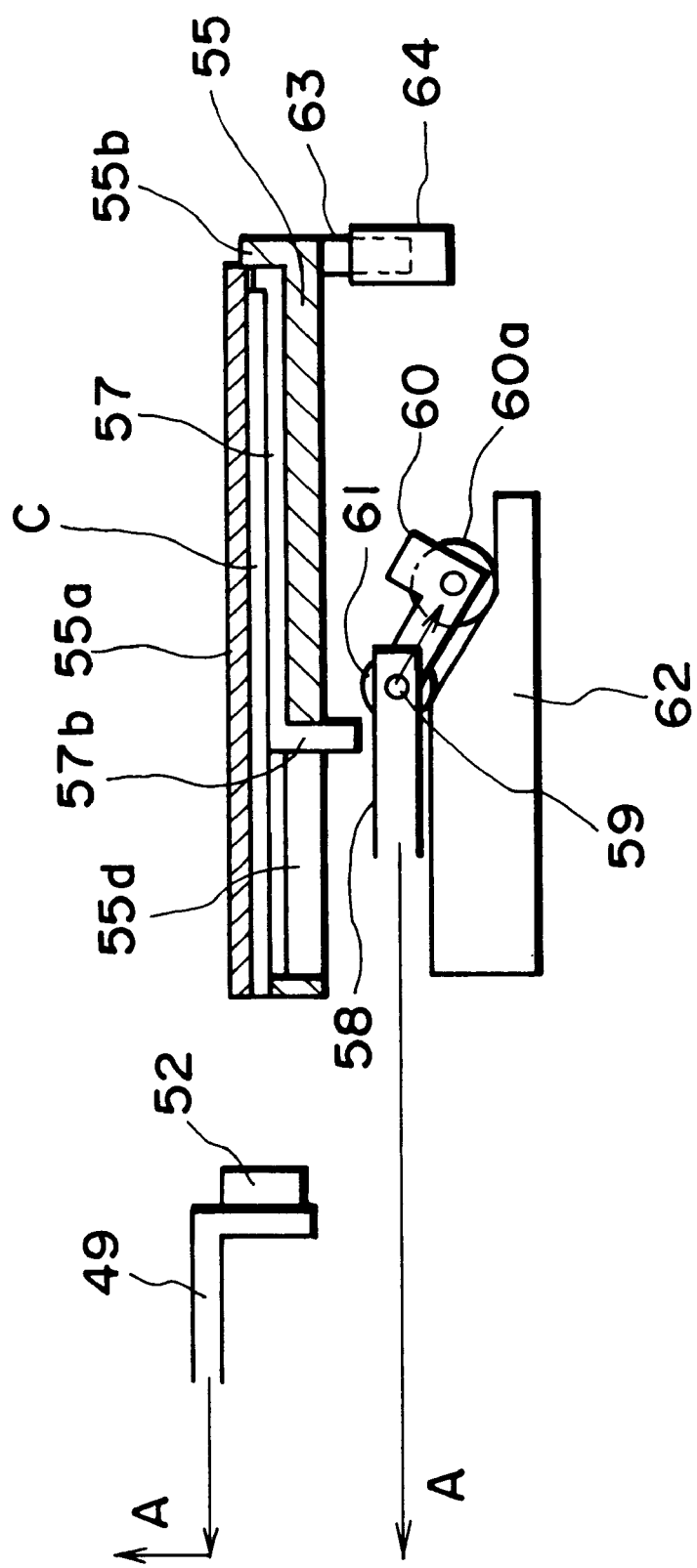
FIG. 12 is a view illustrating the ejecting operation of the apparatus shown in FIG. 5.

After the completion of a recording/reproducing operation the light shielding plate 63 is overlapped with the sensor 64 as shown in FIG. 12 when the card base 55 is moved to the inject position, and the driving motor 27 is driven in the reverse direction by the signal from the sensor 64. The driving force of the driving motor 27 is given to the idler gear 36 through the motor gear 28, speed reducing gear 26, and connecting gear 39 to cause it to be rotated so that the swinging arm 34 is rotated in the reverse direction. Hence, the swing gear 37 is allowed to engage with the move gear 42a and the side plate 43a is retracted by the reverse rotation of the move gear 42a. Together with the side plate 43a, the exhaust arm 58 is retracted. The lock member 60 is rotated upwardly while being thrusted along the slanting face of the guide plate 62 to engage with the coupling portion 57b. Thus, the drawing plate 57 is drawn from the card base 55 together with the optical card C. The optical card C is longer than the drawing plate 57. It is therefore possible for the driving rollers 24a and 24b and biasing rollers 30a and 30b to pinch the optical card C. In this way, the engagement of the swing gear 37 and move gear 42a is released. At this time, the setting base 46 reaches the initial position, and further, the optical card C is exhausted from the insertion opening 20 by the rotation of the driving rollers 24a and 24b.

Thus, with the dumper plate 49, it is possible to position the optical card C on the card base 55 with desirable precision. Also, by thrusting the trailing end of the optical card C which has been positioned on the card base 55, it is possible to speed up the rising of the card base 55 to thereby quicken the recording/reproducing speed. Then, with the reliable holding of the optical card C, it is possible to reduce focus errors and tracking errors which are generated by the vibration of the optical card C in recording/reproducing operations. Also, when the optical card C is exhausted, it is possible to shorten the carrying time because the operations required to withdraw the optical card C from the card base 55 and exhaust it by the driving rollers 24a and 24b are performed continuously.

Figure 13:
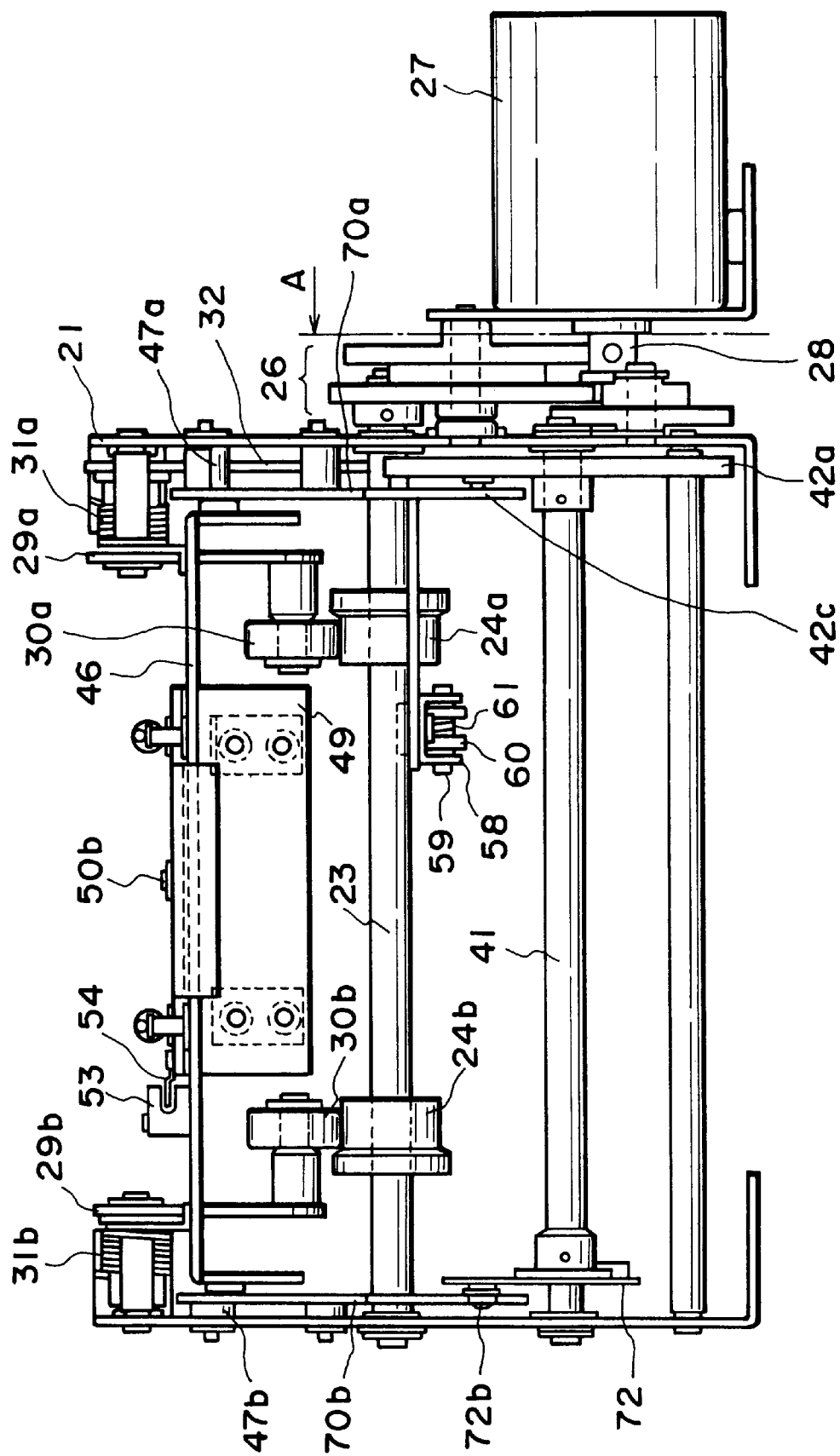
FIG. 13 is a front view illustrating another embodiment of an apparatus for carrying an information recording medium according to the present invention.
Figure 14:
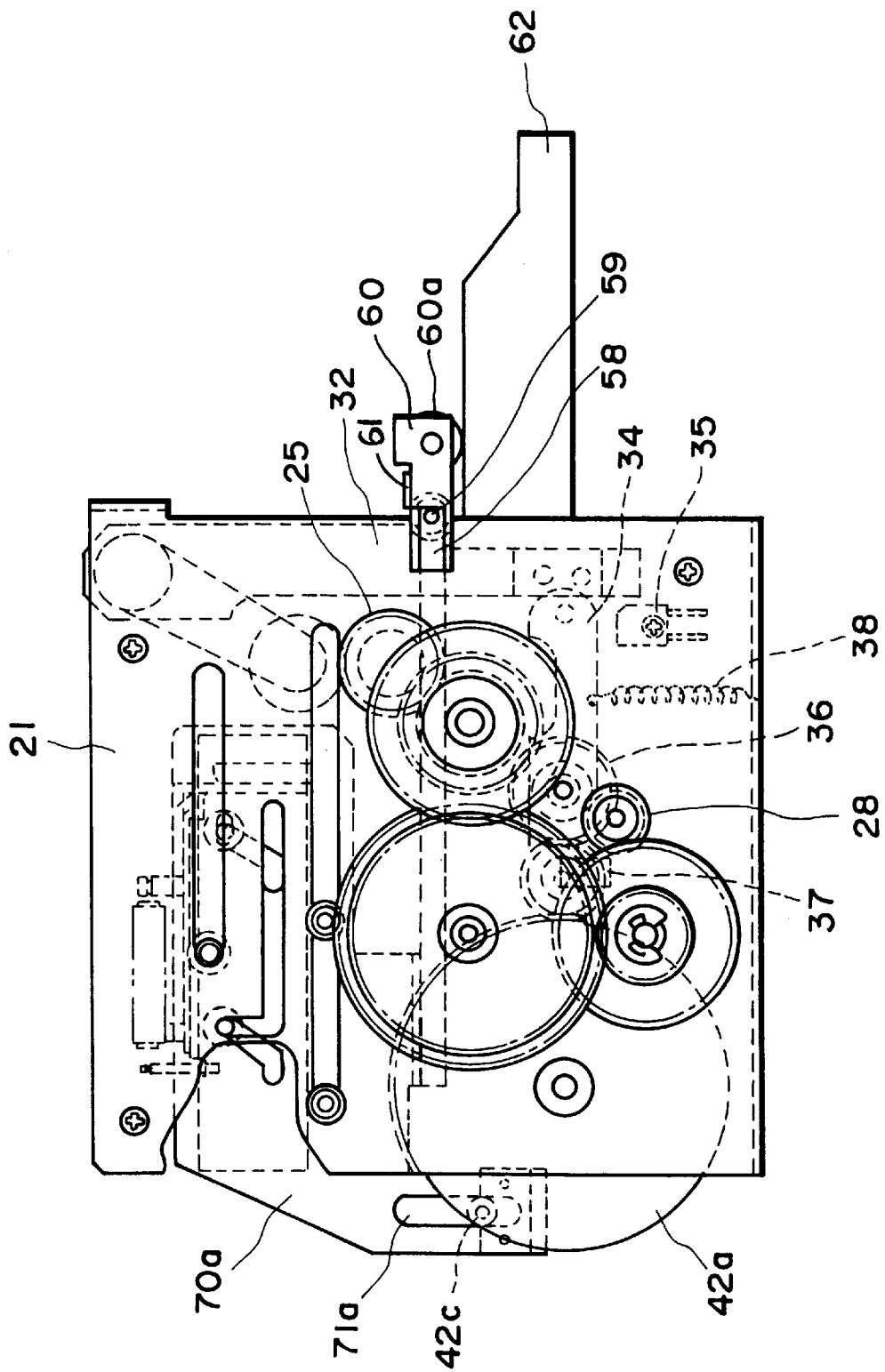
FIG. 14 is a side view illustrating of the apparatus shown in FIG. 13.

Now, FIGS. 13 and 14 illustrate another embodiment, and here, the description will be made only of the parts which differ from the aforesaid embodiment. The rotative ring 42c which is rotatively fixed to a shaft perpendicular to the plane in the vicinity of the circumference of the side face of a move gear 42a is allowed to engage with the groove 71a which is formed on a side plate 70a, and to convert the rotational movement of the move gear 42a into a link movement through the groove 71a. The structure thus formed enables the side plate 70a to move linearly. On the left-hand end of a coupling shaft 41, a cam plate 72 is fixed and is connected to the side plate 70b which is located on the left-hand side through the rotative ring 72a and a groove which is not shown. Even in this case, the side plates 70a and 70b can perform the same linear motion as the side plates 43a and 43b of the aforesaid embodiment.

What is claimed is:

1. An information recording/reproducing apparatus for recording and/or reproducing information on an information recording medium using an optical head, comprising:

a card base, reciprocally movable with respect to the optical head, for holding the information recording medium;

feeding means for feeding the information recording medium to said card base;

a slide plate provided on said card base for receiving the information recording medium, said slide plate being slidable on said card base in a feeding direction of the information recording medium;

a contacting portion, provided on said slide plate, adapted to contact a leading portion of the information recording medium in the feeding direction; and drawing means for drawing said slide plate out of said card base in a direction opposite to the feeding direction to eject the information recording medium from said card base, wherein said feeding means comprises driving rollers for carrying the information recording medium to said card base and a setting plate for setting the information recording medium on said card base after the information recording medium has been carried by said driving rollers, wherein said driving rollers, setting plate, and drawing means are driven by a same driving motor.

2. An apparatus according to claim 1, wherein said slide plate is arranged at a position to contact a bottom side of the information recording medium supported on said card base.

3. An information recording/reproducing apparatus for recording and/or reproducing information on an information recording medium using an optical head, comprising:

a card base for holding the information recording medium;

moving means for effecting a reciprocally linear movement between said card base and said optical head;

feeding means for feeding the information recording medium to said card base;

a slide plate provided on said card base and being slidable on said card base in a feeding direction of the information recording medium;

a contacting portion provided on said slide plate and adapted to contact the information recording medium;

a projecting portion provided on said slide plate and projecting outside said card base; and drawing means provided outside said card base, said drawing means contacting with said projecting portion to draw said slide plate out of said card base when the information recording medium is ejected from said card base.

4. An information recording/reproducing apparatus according to claim 3, wherein said card base includes an opening on a bottom surface, and said projecting portion projects under said bottom surface of said card base through the opening.

5. An information recording/reproducing apparatus for recording and/or reproducing information on an information recording medium using an optical head, comprising:

a card base for holding the information recording medium;

moving means for effecting a reciprocally linear movement between said card base and said optical head;

feeding means for feeding the information recording medium to said card base;

a slide plate provided on said card base for receiving the information recording medium, said slide plate being slidable on said card base in a feeding direction of the information recording medium;

a contacting portion, provided on said slide plate, adapted to contact a leading portion of the information recording medium in the feeding direction; and drawing means for drawing said slide plate out of said card base in a direction opposite to the feeding direction to eject the information recording medium from said card base, wherein said feeding means comprises driving rollers for carrying the information recording medium to said card base and a setting plate for setting the information recording medium on said card base after the information recording medium has been carried by said driving rollers, wherein said driving rollers, setting plate, and drawing means are driven by a same driving motor.

* * * * *

UNITED STATES PATENT AND TRADEMARK OFFICE
CERTIFICATE OF CORRECTION

PATENT NO. : 6,097,692

DATED : August 1, 2000

INVENTOR(S): KAZUNORI SUZUKI

It is certified that error appears in the above-identified patent and that said Letters Patent is hereby corrected as shown below:

<u>COLUMN 4</u>:

Line 33, "amount" should read --mounted--.

Signed and Sealed this

Fifteenth Day of May, 2001

Attest:

NICHOLAS P. GODICI

Attesting Officer     Acting Director of the United States Patent and Trademark Office